Jan. 8, 1935.　　　　G. M. PESTARINI　　　1,987,417
DIRECT CURRENT ELECTRIC MOTOR EQUIPMENT OPERATED IN
CONNECTION WITH ROTARY DIRECT CURRENT TRANSFORMERS
Filed June 24, 1933　　　2 Sheets-Sheet 1

INVENTOR
Giuseppe M. Pestarini
By
ATTORNEY

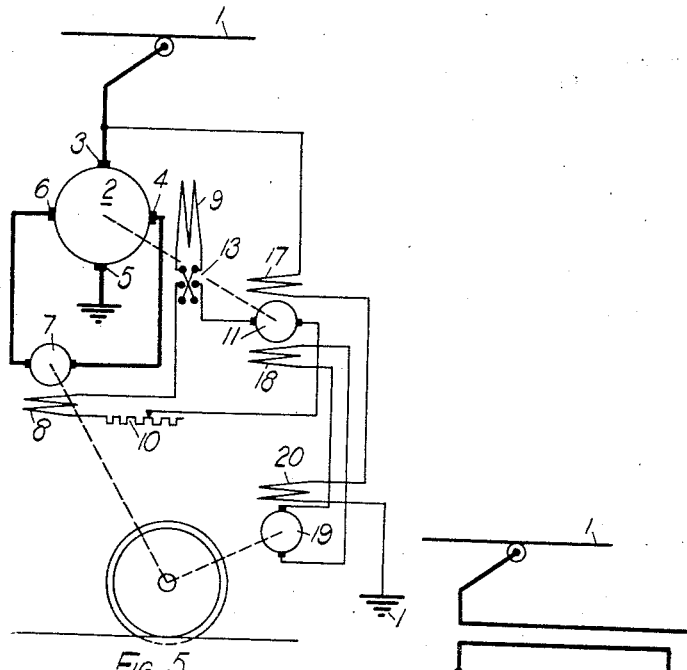
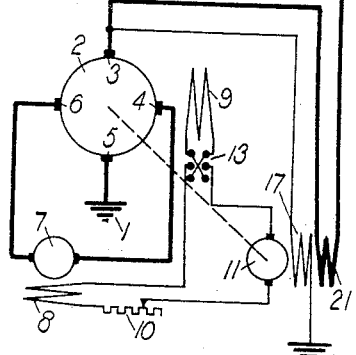
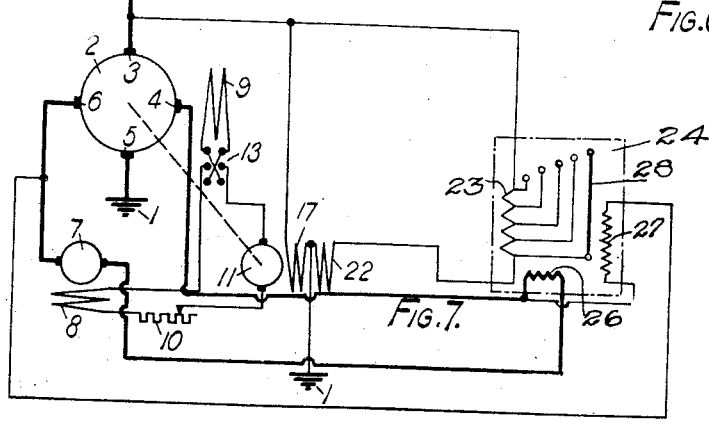

Patented Jan. 8, 1935

1,987,417

UNITED STATES PATENT OFFICE 1,987,417

DIRECT CURRENT ELECTRIC MOTOR EQUIPMENT OPERATED IN CONNECTION WITH ROTARY DIRECT CURRENT TRANSFORMERS

Giuseppe Massimo Pestarini, Sheffield, England

Application June 24, 1933, Serial No. 677,523
In Great Britain July 28, 1932

7 Claims. (Cl. 172—179)

The invention relates to direct current electric motor equipments operated in connection with rotary direct current transformers of the type known as and hereinafter termed metadyne transformers.

A metadyne transformer is a rotary apparatus which is designed to transform electric power supplied to it at a fixed voltage and variable amperes into electric power at constant amperes and variable voltage. The apparatus comprises in general a rotor provided with windings connected to a commutator somewhat similar to the armature of a direct current dynamo electric machine, whilst ordinarily four brushes are arranged to make contact with the commutator of which two, usually diametrically opposite each other, are used for the primary circuit and two others, which may be diametrically opposite each other, in a different radial plane, are used for the secondary circuit or circuits. The rotor is rotated at constant speed. The primary current flowing in the rotor windings sets up a primary flux which is fixed in direction and may be said to be cut by rotor conductors in which a voltage is thereby induced and a constant secondary current can be drawn from the secondary circuit or circuits at variable voltage. A stator may be provided which affords a return path of low magnetic reluctance for the fluxes which are set up by the rotor currents. The stator can be furnished with windings by which various magnetic fluxes can be obtained, which combine with or modify the magnetic fluxes due to the primary and secondary currents circulating in the rotor and thereby regulate the electro-mechanical performance of the machine. Such stator windings may include a winding, known as a "variator" winding, which is arranged to produce a flux co-axial with the flux resulting from the secondary currents flowing in the armature between the secondary brushes, so that the strength of the field due to said variator winding can be adjusted by means of a controller which controls the current in the variator winding and thereby the secondary current flowing from the metadyne transformer to the consumption or load circuit may be adjusted. Several further windings such as those known as "regulator" and "stabilizer" windings may be provided, acting magnetically upon the currents flowing in the armature. The present invention however is not concerned with such "regulator" and "stabilizer" windings per se. The elementary metadyne transformer above indicated may be modified and elaborated in many ways under the same general theory of operation.

For a fuller description of metadyne transformers reference is directed to the specification of French Patents No. 647855, dated 25th February 1922, No. 623438, dated 27th January 1926, and No. 637946, dated 25th November 1926. A description of the general construction and operation of metadyne transformers, generators and motors treated mathematically in considerable detail will also be found in a paper entitled "Esquisse sur la metadyne" by G. M. Pestarini in the Bulletin Scientifique A. I. M. No. 4 April 1931 of L'Association des Ingénieurs Electriciens, published by the Institut Electrotechnique Montefiore, Liège.

In a metadyne motor equipment, as the secondary current is the current supplied to the motor operated in connection with the metadyne transformer the motor torque and consequently the speed of the motor can be changed in accordance with the operation of the aforesaid controller as desired. The field windings of the motor are supplied with current from an exciter the armature of which may be mounted on or mechanically connected with the metadyne rotor.

In order that the motor shall run at definite speeds corresponding to the different values of the current supplied to it, it is necessary that as the desired speed is approached the torque should thereafter diminish when the speed rises so that a balance can be obtained at the desired speed. The current through the variator winding of the metadyne and also the motor excitation should therefor be decreased as the desired speed is reached.

According to the present invention in order to achieve this end the field winding of the motor is associated with the variator winding of the metadyne transformer so that variations in the current in the one are accompanied by corresponding variations in the current in the other and both said windings are supplied with a voltage which changes in value as the secondary voltage of the metadyne transformer changes so that the acceleration of the motor diminishes as the speed thereof approaches the desired speed.

In carrying out the invention preferably both the variator excitation and the motor excitation are varied in accordance with the voltage across metadyne brushes whereat the metadyne voltage changes with the motor speed so that the acceleration of the motor diminishes as the speed thereof approaches the desired value. Conveniently the variator winding and the motor field winding are connected to those metadyne brushes across which the voltage varies inversely as the motor speed. It will usually be found desirable to employ a separate exciter machine for supplying the motor field winding and/or the variator winding and when such exciter is employed its field winding may be connected across the aforesaid brushes of the metadyne either in series with the variator winding if the exciter supplies only the motor field winding, or vice versa. Preferably in cases where the field winding of the motor or of the exciter is supplied from the aforesaid metadyne brushes a constant component of excitation for the motor or the exciter is also provided in order to prevent the motor field from falling to zero when the limiting speed is reached. Thus in the case where an exciter is employed, for example, this machine may have its main field winding connected at one end to one of the brushes of the metadyne and its other end connected through respective resistances to two adjacent other brushes of the metadyne; the exciter field winding thus receives a constant component of excitation, which may be comparatively small in value, direct from the supply. Alternatively the exciter may have two field windings a main one connected as hereinbefore set forth and the other connected to a point of constant voltage, such as across the supply lines.

The present invention also comprises alternative arrangements for varying the excitation of the variator and motor field windings by other sources of appropriately varying voltage than the metadyne brushes specified above and examples of such alternative arrangements are given hereinafter.

To enable the invention to be clearly understood it will now be described with reference to the accompanying drawings, which are electrical diagrams of seven different arrangements in accordance with the invention.

In the accompanying drawings:

Figure 5 is a diagram illustrating another embodiment of the invention and showing a further variation in the exciter arrangement;

Figure 6 is a diagram of an arrangement similar to that shown in Figure 5, but showing another variation in the exciter arrangement; and Figure 7 is a diagram of an arrangement similar to that shown in Figures 5 and 6, but showing a further modification of the invention.

Like reference numerals are used where possible in the several figures.

Figure 1:
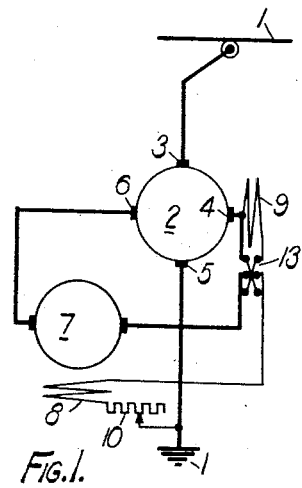
Figure 1 is an electrical diagram showing an arrangement of the apparatus according to one embodiment of the invention.

Referring first to Fig. 1 of the drawings 1, 1 represent the main supply conductors giving variable current at constant voltage. These conductors may be the trolley and ground conductors of an electric traction system. 2 represents the armature or rotor of the metadyne transformer, the yoke of which is omitted for the sake of simplicity. The four brushes co-operating with the metadyne armature are indicated at 3, 4, 5 and 6. Of these brushes one pair of brushes which are diametrically opposite one another such as 3 and 5, is connected between the supply lines 1 through suitable switches (not shown) whilst the other pair of brushes 4 and 6 arranged at right angles to the plane of the brushes 3 and 5 is connected to the armature 7 of a direct current motor which may be for example a traction motor.

In accordance with the present invention and as an elementary arrangement thereof the motor field winding 8 is connected in series with the variator winding 9 of the metadyne, across the brushes 4 and 5, a series resistance 10 being included for controlling the speed of the motor 7. The motor 7 receives constant current at variable voltage. The voltage across the brushes 4 and 5 accordingly decreases as the motor speed increases. The variator winding 9 of the metadyne and the field winding 8 of the motor are thus excited inversely in accordance with the speed of the motor so that the acceleration of the latter diminishes as the speed thereof approaches the desired value as is ultimately determined by the setting of the rheostat 10. At the desired speed the torque or tractive effort of the motor is thus brought down so that a balance is obtained and the motor continues to run at constant speed.

Figure 2:
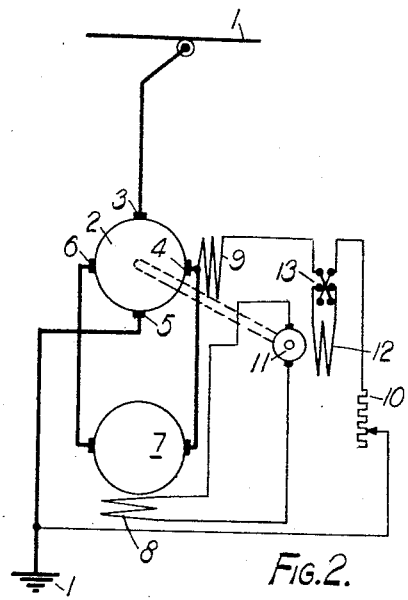
Figure 2 is a diagram showing a modified arrangement wherein the motor field winding is supplied with current from an exciter.

In Fig. 2 of the drawings is shown an arrangement wherein the motor field winding 8 is supplied from an exciter armature 11 the field winding 12 of which is connected, through a reversing switch 13, in series with the variator winding 9 and in series with the rheostat 10, across the brushes 4 and 5 of the metadyne. This arrangement has the same effect as that of the elementary arrangement illustrated in Fig. 1.

Figure 3:
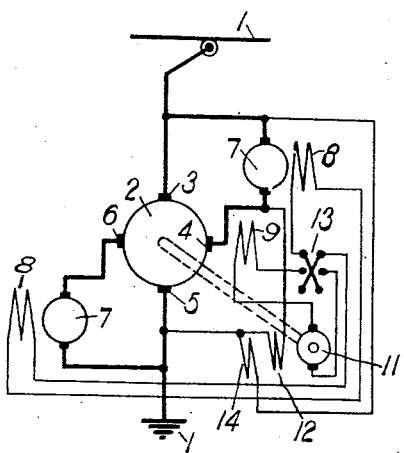
Figure 3 is a diagram showing the invention applied to two motors and employing an exciter.

Referring to Fig. 3 this shows two motors 7 connected to the metadyne in what is called "figure-8" connection; that is to say one of the motors is connected across the brushes 5 and 6 and the other motor is connected across the brushes 3 and 4. The field windings 8 of the two motors are connected in series with one another and through the reversing switch 13 in series with the variator winding 9 to the exciter 11 which has a field winding 12 connected across the brushes 4 and 5 as in the arrangements previously described and a second field winding 14 connected across the primary brushes 3 and 5, that is to the main supply conductors 1. The field winding 14 of the exciter 11 thus supplies a constant component which may be comparatively small namely for the purpose of preventing the fields of the motors from falling to zero when a limiting speed is reached.

Figure 4:
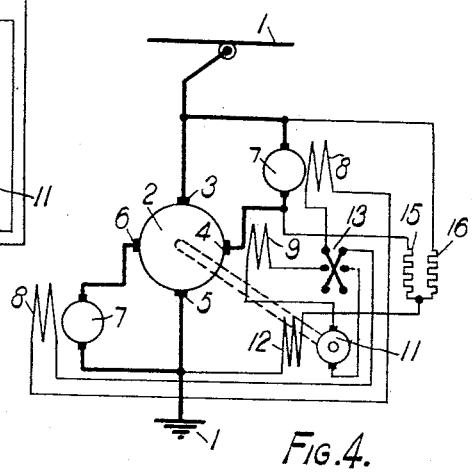
Figure 4 is a diagram showing an arrangement similar to that shown in Figure 3 but showing a variation in the exciter control.

The arrangement shown in Fig. 4 is similar to that shown by Fig. 3 with the exception that the exciter 11 has a single field winding 12 one end of which is connected to the metadyne brush 5 whilst the other end is connected on the one hand through a resistance 15 to the brush 4 of the metadyne and on the other hand said field winding 12 is connected through another resistance 16 to the metadyne brush 3 or trolley conductor 1. The latter connection through the resistance 16 provides the constant component of excitation aforesaid.

In Figs. 2 to 7 inclusive the exciter 11 is indicated diagrammatically as being driven with the metadyne rotor 2 but it will be understood that the exciter may be driven by other means such as a separate motor supplied from the line conductors 1.

In the several figures the reversing switch 13 is for the purpose of causing the motor to run at will in either direction.

In Fig. 5 the exciter 11, conveniently rotating with the metadyne transformer 2, is provided with a field winding 17 which is constantly excited for which purpose it is connected across the supply conductors 1. Said exciter 11 has a second field winding 18 which opposes or bucks the field winding 17 and is connected to the axle driven generator 19 having a field winding 20 which is also connected across the supply conductors 1, conveniently in series with the field winding 17 of the exciter 11. It will be appreciated that since the voltage of the axle driven generator 19 varies with the speed of the motor 7 the voltage applied to the variator winding 9 and the motor field winding 8 is requisitely reduced as the motor accelerates to the desired speed.

In the arrangement shown in Fig. 6 the exciter 11 has two field windings one of which 17 is constantly excited as is the case in the arrangement shown in Fig. 5 whilst the other field winding 21 is connected in the main primary circuit of the metadyne and opposes the field winding 17.

In the arrangement shown in Fig. 7 the exciter 11 has a constantly excited field winding 17 as is the case in the arrangements shown in Figs. 5 and 6 whilst a second field winding 22 opposing the field of the winding 17 is connected across the supply conductors 1 through a rheostat 23 which is adapted to be short-circuited, preferably in steps, by means of a watt-meter type relay 24 having a winding 26 excited in accordance with the secondary current of the metadyne transformer and a winding 27 excited in accordance with the voltage of the motor 7. The contact member 28 operates, when the electro-dynamic effort of winding 26 upon winding 27 is of sufficient strength, to short-circuit progressively the resistance 23.

It will be understood that various minor modifications may be made without departing from the scope of the invention, which moreover is not limited to the actual arrangements shown for providing the voltage variation of the variator winding 9 and the motor field winding 8. It is to be understood that whilst series connection of the variator winding and the motor field winding is preferred it is possible within the scope of the invention to connect these windings in parallel with one another or to excite them independently of each other.

I claim:

1. A direct current motor equipment comprising a metadyne transformer having a stator and a rotor, means associated with said rotor for providing a primary circuit through the same, a motor having a field exciting winding, means also associated with said rotor for providing a secondary circuit through the same including said motor and for producing a secondary flux in said metadyne transformer, a variator field exciting winding for said metadyne transformer arranged to affect mainly said secondary flux, means for causing current variations in one of said windings to produce corresponding variations of current in the other of said windings, and means for supplying both of said windings with a voltage which changes in value as the secondary voltage of said metadyne transformer changes so that the acceleration of said motor diminishes as the speed thereof approaches the desired speed.

2. A direct current motor equipment comprising a metadyne transformer having a stator and a rotor provided with windings and a commutator connected thereto, a primary brush set associated with said commutator, means including a secondary brush set associated with said commutator and electrically displaced from said primary brush set for producing a secondary flux, a variator field exciting winding on said stator arranged to affect mainly said secondary flux, a motor connected across said secondary brush set and having a field exciting winding, means for producing variations in current in one of said windings corresponding to variations in current in the other of said windings, and means for supplying both of said windings with a voltage which changes in value as the secondary voltage of said metadyne transformer changes so that the acceleration of said motor diminishes as the speed thereof approaches the desired speed.

3. A direct current motor equipment comprising a metadyne transformer having a stator and a rotor provided with a winding and a commutator connected thereto, a motor having a field exciting winding, a variator field exciting winding for said metadyne transformer, means including brushes associated with said commutator for supplying current to said motor, brushes associated with said commutator and including at least one of the brushes supplying current to said motor arranged to produce a voltage changing with the speed of said motor, and means connected across said last mentioned brushes for causing variation of both the variator excitation and the excitation of said motor in accordance with the voltage across said last mentioned brushes so that the acceleration of said motor diminishes as the speed thereof approaches the desired speed.

4. A direct current motor equipment comprising a metadyne transformer having a stator and a rotor provided with a winding and a commutator connected thereto, a motor having a field exciting winding, a variator field exciting winding for said metadyne transformer, means including brushes associated with said commutator for supplying current to said motor, brushes associated with said commutator including at least one of said brushes supplying current to said motor arranged to produce a voltage varying inversely with the speed of said motor, and means connected across said last mentioned brushes for causing variation of both the variator excitation and the excitation of said motor in accordance with the voltage across said last mentioned brushes so that the acceleration of said motor diminishes as the speed thereof approaches the desired speed.

5. A direct current motor equipment comprising a metadyne transformer having a stator and a rotor, means associated with said rotor for providing a primary circuit through the same, a motor having a field exciting winding, means also associated with said rotor for providing a secondary circuit through the same including said motor and for producing a secondary flux in said metadyne transformer, a variator field exciting winding for said metadyne transformer arranged to affect mainly said secondary flux, means connecting said winding in series for causing current variations in one of said windings to produce corresponding variations of current in the other of said windings, and means for supplying both of said windings with a voltage which changes in value as the secondary voltage of said metadyne transformer changes so that the acceleration of said motor diminishes as the speed thereof approaches the desired speed.

6. A direct current motor equipment comprising a metadyne transformer having a stator and a rotor, means associated with said rotor for providing a primary circuit through the same, a motor having a field exciting winding, means also associated with said rotor for providing a secondary circuit through the same including said motor and for producing a secondary flux in said metadyne transformer, a variator field exciting winding for said metadyne transformer arranged to affect said secondary flux, means for causing current variations in one of said windings to produce corresponding variations of current in the other of said windings, means for producing a substantially constant component of excitation in at least one of said windings, and means for supplying both of said windings with a voltage which changes in value as the secondary voltage of said metadyne transformer changes so that the acceleration of said motor diminishes as the speed thereof approaches the desired speed.

7. A direct current motor equipment comprising a metadyne transformer having a stator and a rotor provided with windings and a commutator connected thereto, a primary brush set associated with said commutator, means including a secondary brush set associated with said commutator and electrically displaced from said primary brush set for producing a secondary flux, a variator field exciting winding on said stator arranged to affect said secondary flux, a motor connected across one of said secondary brushes and one of the other of said brushes and having a field exciting winding, means for producing variations in current in one of said windings corresponding to variations in current in the other of said windings, means for supplying both of said windings with a voltage which changes in value as the secondary voltage of said metadyne transformer changes so that the acceleration of said motor diminishes as the speed thereof approaches the desired speed, said last mentioned means including an exciter, and means connected across said brushes and including one of said primary brushes for exciting said exciter.

GIUSEPPE MASSIMO PESTARINI.